United States Patent [19]
Fernandez et al.

[11] Patent Number: 5,637,413
[45] Date of Patent: Jun. 10, 1997

[54] OVERVOLTAGE DISCONNECT CIRCUIT FOR LITHIUM ION BATTERIES

[75] Inventors: José M. Fernandez, Lawrenceville; Erika D. Mack, Doraville, both of Ga.

[73] Assignee: Motorola, Inc., Schaumburg, Ill.

[21] Appl. No.: 543,549

[22] Filed: Oct. 16, 1995

[51] Int. Cl.$^6$ ................................................ H01M 14/00
[52] U.S. Cl. ........................ 429/7; 429/61; 320/31; 320/39
[58] Field of Search ..................... 429/7, 50, 61; 320/30, 31, 39, 40

[56] References Cited

U.S. PATENT DOCUMENTS

| | | | |
|---|---|---|---|
| 4,327,317 | 4/1982 | Heine et al. | 320/23 |
| 4,467,266 | 8/1984 | Ritchie | 320/40 |
| 5,248,927 | 9/1993 | Takei et al. | 320/2 |
| 5,518,832 | 5/1996 | Fernandez et al. | 429/49 |
| 5,530,336 | 6/1996 | Eguchi et al. | 320/5 |
| 5,539,299 | 7/1996 | Fernandez et al. | 320/39 |
| 5,547,775 | 8/1996 | Eguchi et al. | 429/7 |
| 5,554,919 | 9/1996 | Uchida | 320/14 |

*Primary Examiner*—Stephen Kalafut
*Assistant Examiner*—Jonathan S. Krueger
*Attorney, Agent, or Firm*—Kenneth M. Massaroni

[57] ABSTRACT

A lithium ion or similar lithium secondary battery pack (10) includes an overvoltage disconnect circuit having an overvoltage disconnect switch (14), a voltage detector (16), and a delay circuit (18). The battery pack is connectable to a recharger which was not designed to accomodate the charge regime of the lithium ion cell or cells (12), such as a nickel system recharger (20). The voltage detector samples the battery voltage and changes its output signal if the battery voltage reaches an upper voltage threshold. The output of the voltage detector will not revert back until the battery voltage drops to a lower voltage threshold, which is below the upper voltage threshold.

12 Claims, 1 Drawing Sheet

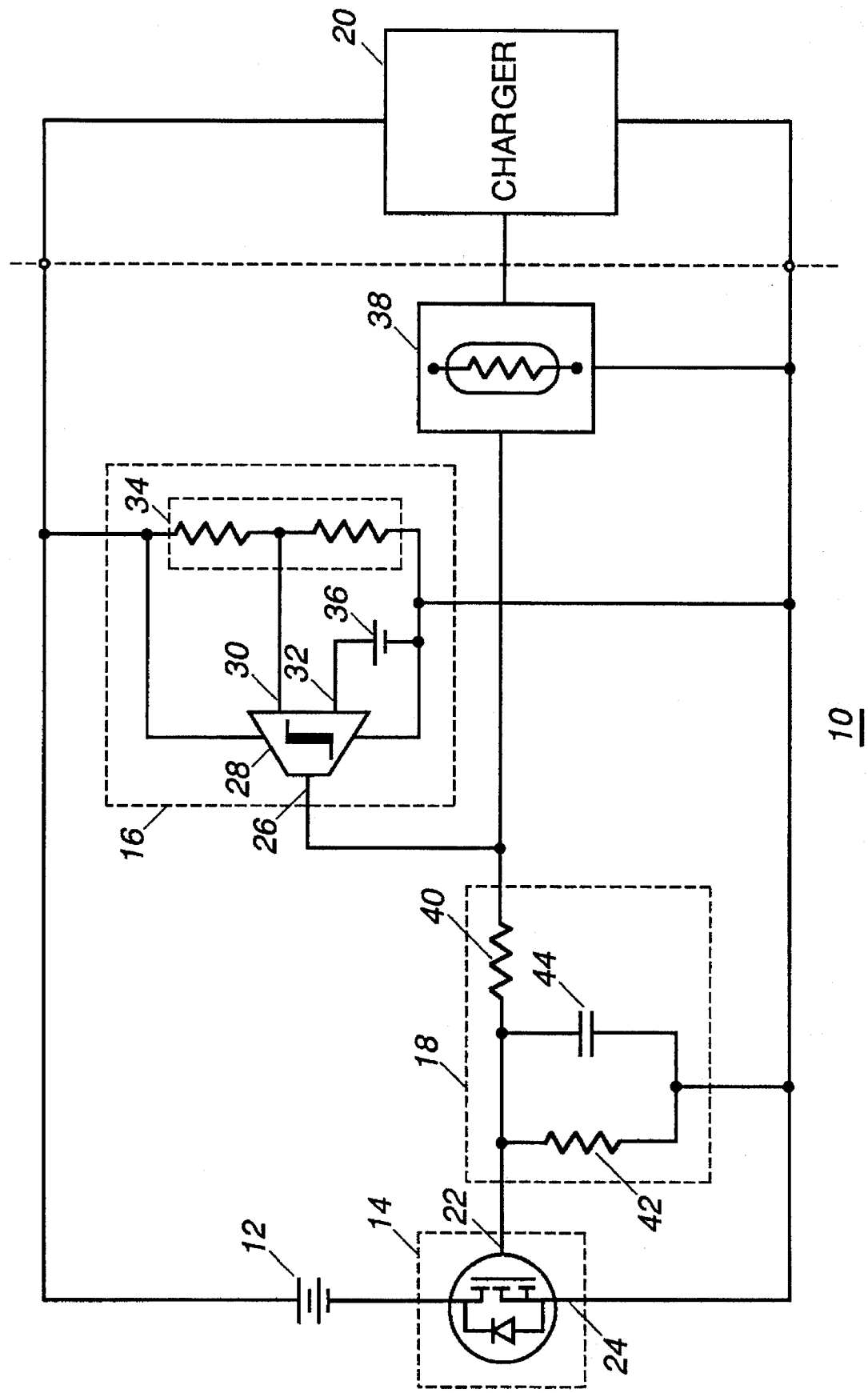

OVERVOLTAGE DISCONNECT CIRCUIT FOR LITHIUM ION BATTERIES

TECHNICAL FIELD

This invention relates in general to rechargeable batteries, and in particular to lithium ion rechargeable batteries for recharging in nickel cadmium and nickel metal hydride battery rechargers.

BACKGROUND

An increasing number of portable electronic products are available today which are powered by a battery pack. These products include such things as cellular telephones, portable radios, pagers and voice recorders which are conveniently mobile and operate using rechargeable batteries. Many different battery chemistries have been used for many years which meet the need for recharging capability. Probably the most popular chemistries include nickel cadmium and nickel metal hydride. A relatively new chemistry, however, generally referred to as lithium ion, but may include similar lithium secondary cell chemistries such as lithium polymer, enables a cell to be recharged while offering many advantages over other types of rechargeable cells. These benefits primarily are directed to low weight and overall size with a high energy density. One unique factor to be considered when using a lithium ion cell is its charging scheme. A lithium ion cell is not charged in the same manner as cells utilizing a nickel chemistry.

Nickel-cadmium and nickel metal hydride cells are typically charged using a rapid charge by applying a constant current until a certain event occurs. This event may be coupled to the cell reaching a predetermined high voltage, decreasing to a predetermined low voltage or an increase in the cell's temperature. This is in contrast with the lithium ion cell which requires a two step charging process to achieve optimum performance. The first step of this process provides that the battery charger apply a constant current level while the cell's voltage remains below a predetermined threshold. Once the voltage increases to that threshold, the second step insures the battery charger is held at the threshold voltage allowing the current to decrease. Once the current decreases sufficiently to a desired level, the lithium ion cell is fully recharged.

This two step process presents a problem when considering charging lithium ion cells in a charger designed for nickel systems. Generally, nickel system chargers apply only a constant current which allows the voltage of the cells to rise unimpeded. The voltage may rise to any level provided the battery pack does not become too hot, i.e. increase to a undesired and dangerous level. Once the nickel system battery pack becomes hot, the charger detects this state and switches from the rapid high current charge to a value of approximately 5–10% that of the rapid current value. This lower current mode is generally referred to as a trickle current or trickle charge.

Hence, the charging scheme offered by current nickel system chargers will not properly charge a lithium ion cell. In particular, if a lithium ion type cell or battery is placed or forced into a nickel system charger, the nickel system charger can cause the voltage of the lithium ion type cell to exceed the threshold voltage of the cell. Therefore, to protect lithium ion type cells, an overvoltage based disconnect circuit should be placed in a lithium ion type battery pack. Such a circuit disconnects the battery pack from the charger if the voltage of the cell or cells reaches the threshold level.

A disconnect circuit for a lithium ion battery pack must include hysteresis for the voltage threshold. Otherwise when the circuit disconnects the battery pack from the charger, and therefore removes current from the cell or cells, the voltage of the cells will drop below the threshold, and the disconnect circuit will reconnect the battery pack to the charger. This may result in a continuous oscillation mode cycling between connect and disconnect modes. During these oscillations, it is very likely that transients may be generated which will cause the cell voltage to exceed the threshold level. Providing hysteresis in the disconnect circuit will accomodate the voltage drop of a cell when the current is removed, and keep the battery pack disconnected until it is removed from the charger.

Therefore there is a need, in a lithium ion battery pack which may be recharged in a nickel system charger, for an overvoltage disconnect circuit which operates according to a predefined hysteresis.

BRIEF DESCRIPTION OF THE DRAWINGS

The FIGURE is an illustration of a circuit diagram of an overvoltage disconnect circuit in accordance with the instant invention.

DETAILED DESCRIPTION OF THE PREFERRED EMBODIMENTS

While the specification concludes with claims defining the features of the invention that are regarded as novel, it is believed that the invention will be better understood from a consideration of the following description in conjunction with the drawing figures, in which like reference numerals are carried forward.

Referring now to the figure, there is illustrated therein a circuit diagram of an overvoltage disconnect circuit for a battery pack 10. The battery pack comprises at least one lithium ion battery cell 12, and it is contemplated that another type of lithium secondary cell, such as, for example, a lithium polymer cell, may be used equivalently instead. The battery pack 10 includes an overvoltage disconnect circuit which comprises an overvoltage switch 14, a voltage detector 16, and a delay circuit 18. The battery pack is intended for use with a portable device, such as, for example, a cellular phone. To recharge the battery cell or cells, the battery pack is connected to a charger 20. The overvoltage circuit is useful when the charger 20 is a charger designed to recharge other types of secondary batteries, in particular nickel cadmium and nickel metal hydride, hereafter referred to as nickel systems. Since nickel system chargers are not typically designed to limit voltage applied to a battery pack for charging purposes, it is possible that an unsafe voltage level may be applied to the battery pack 10. The overvoltage disconnect circuit acts to protect the lithium ion battery cell or cells from experiencing an overvoltage condition by electrically disconnecting the lithium ion battery cell or cells from the charger 20.

The overvoltage switch 14 is coupled in series with the battery cell or cells and has a control input 22. The overvoltage switch operates in either an open state, which blocks electrical conduction, or a closed state which allows electrical conduction. It operates in the open state in response to an open control signal being applied to the control input 22, and operates in the closed state in response to a closed control signal being applied to said control input. Due to factors such as cost, size, and reliability, it is preferred that the overvoltage switch 14 is a MOSFET. MOSFETs are used widely as switch devices and are accordingly well understood, although it will be appreciated by those skilled in the art that other switches, such as relays and other semiconductor switches, may be used equivalently. As such, to operate the overvoltage switch in an open state, the open control signal is a voltage of less than about 1 volt. To operate the overvoltage switch in the closed state, the closed control signal is a voltage of at least 1.5 volts. Both the open control signal and the closed control signal are measured with respect to the overvoltage switch, and in the preferred case where the overvoltage switch is a MOSFET, the signal voltage levels are measured between the control input 22, which in the preferred embodiment is the gate of the MOSFET, and the source 24 of the MOSFET.

Control of the overvoltage switch 14 is accomplished by the voltage detector 16. The voltage detector has an output 26 and is used for sensing the battery voltage and providing the open control signal and the closed control signal to the control input of the overvoltage switch in response to the battery voltage according to a hysteresis defined by a lower battery voltage threshold and an upper battery voltage threshold. The battery voltage is defined as the voltage measured across the battery cell or cells and the overvoltage switch. In the preferred embodiment, the voltage detector comprises a comparator circuit 28 having hysteresis, a first input 30, a second input 32, and an output which is the output 26 of the voltage detector. The comparator circuit also comprises a comparator, and input and feedback resistors chosen to affect the required performance. Comparator circuits are well known and used in an enormous variety of applications, and as such, the design of such a circuit is nearly a trivial task for one of ordinary skill. The voltage detector further comprises a voltage divider 34 for providing a voltage signal proportional to the battery voltage to the first input of the comparator circuit, and a voltage reference 36 for providing a reference voltage to the second input of the comparator circuit. This arrangement of a comparator circuit, voltage divider, and voltage reference is used in a wide variety of applications. It is contemplated that the voltage detector may be physically packaged as an integrated circuit (IC), and the IC may include the delay circuit, and it may further include the overvoltage switch. It is further contemplated that an overvoltage disconnect IC would allow for external elements, such as resistors, to be connected to the IC so that delay times and hysteresis thresholds could be set at different levels according to a particular application.

The hysteresis of the comparator circuit is designed such that, initially, the output of the comparator circuit provides the closed control signal to the control input of the overvoltage switch. When the charger begins charging, i.e. passing a charging current through the battery pack, the battery voltage begins to rise. Since the closed control signal is applied to the overvoltage switch initially, it will initially be in the closed state, allowing conduction and producing only a very small voltage drop. Virtually all of the battery voltage comes from the voltage of the battery cell or cells at this stage. As the battery voltage increases, it reaches an upper battery voltage threshold, at which point the output of the comparator circuit switches to the open control signal. This upper voltage threshold is based on a per cell voltage in the range of 3.3–4.6 volts per cell, and is typically 4.1 volts or 4.2 volts per cell. The choice depends on the specific type of lithium battery cell used. As an example, if the chemistry of a particular lithium ion cell requires the voltage to be limited to 4.1 volts, and 3 such cells are connected in series, then the upper voltage threshold would be 3×4.1= 12.3 volts. However, because of the delay circuit 18, the overvoltage switch does not immediately change states.

The delay circuit allows for other events to take place prior to opening or closing the overvoltage switch. For example, before the overvoltage switch changes states, the battery pack may attempt to make the charger 20 to stop charging by another method. One such method takes advantage of the fact that nickel system chargers typically monitor battery pack temperature closely. When the battery pack reaches a predetermined temperature, or if the change in temperature reaches a predetermined rate, a nickel system charger will stop applying a high rate current and switch to a low rate current which is 5–10% that of the high rate current. In a preferred embodiment, this would be accomplished by connecting the output 26 of the voltage detector 16 to a temperature sensing circuit 38. When the open control signal is applied to the temperature sensing circuit, it sends a signal to the charger simulating a hot battery pack, thereby causing the charger to switch charge current modes. A more complete description of this type of circuit is described in co-pending and commonly assigned U.S. patent application, Ser. No. 08/364,582, filed Dec. 27, 1994 in the name of Fernandez et al, and entitled "APPARATUS AND METHOD OF SIMULATING HIGH BATTERY TEMPERATURE USED IN A RECHARGEABLE BATTERY", the disclosure of which is hereby incorporated by reference.

Once the charger switches current modes, the battery voltage will drop due to the series resistance of the battery cell or cells. Due to the hysteresis of the comparator circuit 28, the battery voltage must drop below a lower voltage threshold before the output of the voltage detector will revert back to the closed control signal. This lower voltage threshold will be at least 0.1 volts and not more than 1.5 volts below the upper voltage threshold. Preferably it should be set at about a voltage equivalent to the forward voltage of a diode, or about 0.7 volts, below the upper voltage threshold.

If the charger 20 does not change current modes after some time period, determined by the specific design of the delay circuit, then the overvoltage switch will change state, from the closed state to the open state, thereby blocking any further conduction through the battery cell or cells. When this occurs, the charger will, at least momentarily, continue trying to charge the battery pack. As a result, the voltage output of the charger, which is the battery voltage, will rise to some maximum level. The voltage provided by the charger in excess of the voltage across the battery cell or cells will be evident across the overvoltage switch. The delay time period provided by the delay circuit is at least 1 millisecond, and more typically in the range of 40 milliseconds to 3 seconds.

To simplify the design of the delay circuit, it is preferred that it consist of a simple resistor-capacitor timing circuit. Specifically, it is comprised of a series resistor 40 connected in series between the output of the voltage detector and the control input of the overvoltage switch, and a shunt resistor 42 in parallel with a shunt capacitor 44 connected across the overvoltage switch. The ratio of the resistance of the shunt resistor to the series resistor is preferably 10:1. That is, the resistance value of the shunt resistor should be about 10 times that of the series resistor.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An overvoltage disconnect circuit for a battery pack having at least one lithium ion battery cell, said battery pack being rechargeable with a nickel system charger, said overvoltage disconnect circuit comprising:

an overvoltage switch, having a control input, coupled in series with said at least one lithium ion battery cell, said overvoltage switch having an open state and a closed state, and operating in said open state in response to an open control signal being applied to said control input, operating in said closed state in response to a closed control signal being applied to said control input, and wherein a battery voltage from said at least one lithium ion battery cell is provided across said overvoltage switch and said at least one lithium ion battery cell;

a voltage detector, having an output, for sensing said battery voltage and providing said open control signal and said closed control signal to said control input of said overvoltage switch in response to said battery voltage according to a hysteresis defined by a lower battery voltage threshold and an upper battery voltage threshold; and a delay circuit connected between said output of said voltage detector and said control input of said overvoltage switch for delaying said open control signal and said closed control signal from said voltage detector to said overvoltage switch by a delay time period of at least 1 millisecond.

2. An overvoltage disconnect circuit as defined in claim 1, wherein said overvoltage switch is a MOSFET having a source and a gate, and wherein said gate is said control input of said overvoltage switch.

3. An overvoltage disconnect circuit as defined in claim 1, wherein said voltage detector comprises:

a comparator circuit having hysteresis, a first input and a second input for providing said output of said voltage detector;

a voltage divider for providing a voltage signal proportional to said battery voltage to said first input of said comparator circuit; and a voltage reference for providing a reference voltage to said second input of said comparator circuit.

4. An overvoltage disconnect circuit as defined in claim 1 wherein said upper battery voltage threshold is based on a voltage of 4.1 volts per cell.

5. An overvoltage disconnect circuit as defined in claim 1 wherein said upper battery voltage threshold is based on a voltage of 4.2 volts per cell.

6. An overvoltage disconnect circuit as defined in claim 1 wherein said lower battery voltage threshold is at least 0.1 volts and not more than 1.5 volts below said upper battery voltage threshold.

7. An overvoltage disconnect circuit as defined in claim 6 wherein said lower battery voltage threshold is about 0.7 volts below said upper battery voltage threshold.

8. An overvoltage disconnect circuit as defined in claim 1, wherein said delay circuit comprises:

a series resistor connected in series between said output of said voltage detector and said control input of said overvoltage switch; and a shunt resistor in parallel with a shunt capacitor connected across said overvoltage switch.

9. An overvoltage disconnect circuit as defined in claim 1, wherein said delay time period is more than 40 milliseconds and less than 3 seconds.

10. An overvoltage disconnect circuit as defined in claim 2, wherein said open control signal is a voltage of less than about 1 volt between said source and said gate of said MOSFET.

11. An overvoltage disconnect circuit as defined in claim 2, wherein said closed control signal is a voltage of at least 1.5 volts between said source and said gate of said MOSFET.

12. An overvoltage disconnect circuit as defined in claim 1, wherein said voltage detector and said delay circuit are physically packaged together in an integrated circuit.

* * * * *